United States Patent
Yang et al.

(10) Patent No.: US 12,430,526 B2
(45) Date of Patent: Sep. 30, 2025

(54) METHOD AND SYSTEM FOR SCANNING A CODE ON A TRANSPARENT PART

(71) Applicant: Applied Materials, Inc., Santa Clara, CA (US)

(72) Inventors: Yao-Hung Yang, Santa Clara, CA (US); Chih-Yang Chang, Santa Clara, CA (US); Shannon Wang, Santa Clara, CA (US)

(73) Assignee: Applied Materials Inc., Santa Clara, CA (US)

( * ) Notice: Subject to any disclaimer, the term of this patent is extended or adjusted under 35 U.S.C. 154(b) by 0 days.

(21) Appl. No.: 18/207,225

(22) Filed: Jun. 8, 2023

(65) Prior Publication Data

US 2024/0412020 A1 Dec. 12, 2024

(51) Int. Cl.
*G06K 7/14* (2006.01)

(52) U.S. Cl.
CPC ......... *G06K 7/1447* (2013.01); *G06K 7/1417* (2013.01); *G06K 7/1456* (2013.01)

(58) Field of Classification Search
CPC ... G06K 7/1447; G06K 7/1417; G06K 7/1456
See application file for complete search history.

(56) References Cited

U.S. PATENT DOCUMENTS

| | | | | |
|---|---|---|---|---|
| 4,644,151 A * | 2/1987 | Juvinall | ................ | B07C 5/3408 235/494 |
| 4,710,615 A * | 12/1987 | Meyers | .............. | G06K 7/10871 235/462.42 |
| 5,105,070 A * | 4/1992 | Wike, Jr. | ................ | G06K 7/109 359/223.1 |
| 5,155,346 A * | 10/1992 | Doing | ................ | G06K 7/10871 235/462.43 |
| 5,252,814 A * | 10/1993 | Tooley | ............... | G06K 7/10871 235/462.14 |
| 5,268,562 A * | 12/1993 | Lazaridis | ........... | G06K 7/10861 250/566 |
| 5,988,506 A * | 11/1999 | Schaham | ........... | G06K 7/10811 235/462.1 |
| 6,016,961 A * | 1/2000 | Hippenmeyer | .... | G06K 7/10594 235/462.23 |
| 6,121,599 A * | 9/2000 | Traber | ............... | G01N 21/5911 250/559.07 |
| 6,460,770 B1 | 10/2002 | Kucharczyk | | |
| 6,598,789 B1 * | 7/2003 | Matsumoto | ......... | G03F 7/70741 235/383 |

(Continued)

FOREIGN PATENT DOCUMENTS

| | | | | |
|---|---|---|---|---|
| CN | 112828481 A | 5/2021 | | |
| JP | 2007/172261 A | 7/2007 | | |
| WO | WO-2022195034 A1 * | 9/2022 | ......... | G06K 7/10732 |

OTHER PUBLICATIONS

PCT International Search Report and Written Opinion for PCT/US2024/021575 dated Jul. 17, 2024.

*Primary Examiner* — Thien M Le
*Assistant Examiner* — Asifa Habib
(74) *Attorney, Agent, or Firm* — Moser Taboada (57) ABSTRACT

Methods and apparatus for scanning a code on or in a transparent part, the method comprising: illuminating the code to generate a projected image of the code on a projection surface spaced from the transparent part; and machine scanning the projected image.

20 Claims, 8 Drawing Sheets

(56) References Cited

U.S. PATENT DOCUMENTS

| | | | | |
|---|---|---|---|---|
| 6,883,711 B2* | 4/2005 | Patton | ................ | G06K 7/10722 235/462.14 |
| 7,389,930 B2* | 6/2008 | Liu | ................ | G03F 7/70541 235/462.14 |
| 8,236,209 B1* | 8/2012 | Conley | ................ | G02B 3/0031 264/2.5 |
| 8,448,866 B2* | 5/2013 | Harttig | ................ | G06K 7/1443 235/462.13 |
| 9,269,035 B2* | 2/2016 | Redd | ................ | G06K 19/06178 |
| 11,720,775 B2* | 8/2023 | Ophardt | ................ | A47K 5/1202 222/230 |
| 11,720,921 B2* | 8/2023 | Manning | ................ | G06Q 30/0256 705/14.54 |
| 2002/0030817 A1* | 3/2002 | Matsumoto | ................ | G06K 7/10861 356/401 |
| 2002/0100805 A1* | 8/2002 | Detwiler | ................ | G06K 7/10544 235/462.14 |
| 2003/0150917 A1* | 8/2003 | Tsikos | ................ | G02B 26/105 235/454 |
| 2003/0160100 A1* | 8/2003 | Ito | ................ | G06K 7/10712 235/462.42 |
| 2003/0179354 A1* | 9/2003 | Araki | ................ | G03F 7/70866 355/53 |
| 2006/0022049 A1* | 2/2006 | Liu | ................ | G03F 7/70741 235/462.05 |
| 2006/0213994 A1* | 9/2006 | Faiz | ................ | G06K 19/06046 235/462.05 |
| 2007/0199997 A1* | 8/2007 | Hoshino | ................ | G06K 17/00 235/462.43 |
| 2008/0173712 A1* | 7/2008 | Nemet | ................ | G06Q 10/06395 235/385 |
| 2009/0212109 A1* | 8/2009 | Harttig | ................ | G06K 7/1443 235/494 |
| 2010/0252632 A1* | 10/2010 | Sowers | ................ | G06K 19/06046 235/494 |
| 2011/0108627 A1* | 5/2011 | Bathelet | ................ | G06K 7/10732 235/454 |
| 2011/0155223 A1* | 6/2011 | Morooka | ................ | H01G 9/2031 977/773 |
| 2013/0292470 A1* | 11/2013 | Shearin | ................ | G06K 7/10722 235/440 |
| 2013/0320276 A1* | 12/2013 | Farrell | ................ | B29C 65/1635 252/582 |
| 2013/0341400 A1* | 12/2013 | Lancaster-Larocque | ................ | G06K 19/06178 235/494 |
| 2015/0248570 A1* | 9/2015 | Johansen | ................ | G06K 7/10722 235/462.05 |
| 2016/0188943 A1* | 6/2016 | Franz | ................ | G06K 7/10831 235/462.2 |
| 2017/0270690 A1* | 9/2017 | Chung | ................ | G06T 7/64 |
| 2017/0316304 A1* | 11/2017 | Aoyama | ................ | B42D 25/342 |
| 2019/0342102 A1* | 11/2019 | Hao | ................ | H04L 9/3247 |
| 2021/0021901 A1 | 1/2021 | Gupta et al. | | |
| 2021/0351050 A1* | 11/2021 | Wong | ................ | H01L 21/67242 |
| 2022/0410607 A1* | 12/2022 | Chen | ................ | B41M 3/14 |
| 2023/0028501 A1* | 1/2023 | Mihailescu | ................ | A61B 6/4258 |
| 2023/0366751 A1* | 11/2023 | van Niekerk | ................ | G09F 3/208 |
| 2023/0401403 A1* | 12/2023 | Stefanini | ................ | G06K 7/10831 |

\* cited by examiner

METHOD AND SYSTEM FOR SCANNING A CODE ON A TRANSPARENT PART

FIELD

Embodiments of the present disclosure generally relate to scanning codes on parts, and more specifically, to scanning codes on or in transparent parts.

BACKGROUND

Codes may be used for part tracing. For example, two-dimensional codes applied to non-transparent parts like aluminum and stainless steel, having a sufficient contrast may be scanned by scanners, such as barcode scanners and QR code readers. However, the inventors have observed that transparent parts, such as glass or quartz, do not have sufficient reflectivity and contrast to allow two-dimensional codes on or in the transparent parts to be read by some scanners.

Accordingly, the inventors provide embodiments of methods and systems to improve scanning of codes on or in transparent parts.

SUMMARY

Methods and apparatus for scanning a code on or in a transparent part are provided herein. In some embodiments, a method for scanning a code on or in a transparent part includes: illuminating the code to generate a projected image of the code on a projection surface spaced from the transparent part; and machine scanning the projected image.

In some embodiments, a system for scanning a code on or in a transparent part includes: a support structure configured to support the transparent part spaced apart from a projection surface; and a light source configured to illuminate the code to generate a projected image of the code on the projection surface.

In some embodiments, a method for scanning a code on or in a transparent part includes: positioning the transparent part at a spaced location between a projection surface and a light source; generating a projected image of the code on a projection surface by illuminating the code using the light source; scanning the projected image; and decoding the code based on scanning the projected image.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of methods and systems for scanning a code on or in a transparent part are provided herein. The methods and systems provided herein project a two-dimensional image of a code, such as a two-dimensional or three-dimensional code, onto a non-transparent projection surface. The contrast between the projected image and the projection surface permits a scanner to machine scan the projected image thus avoiding scanning difficulties of trying to scan the code directly on the transparent part.

As described herein, transparent parts may be partially or fully transparent to visible light, such as white light. In some embodiments, transparent parts may be transparent to radiation having wavelengths longer or shorter than visible light. In some embodiments, transparent parts may be made from glass or quartz.

In some embodiments, the transparent parts may include a code, such as a two-dimensional or three-dimensional code, on (e.g., applied to an outer surface) or in (e.g., embedded below an outer surface) the part. Having the code at least partially embedded in the part may protect the code from damage and data loss. In some examples, the codes may be applied by engraving (e.g., laser engraving), etching, or printing. In some embodiments, the code may include at least one of a bar code or a quick response (QR) code. In some embodiments, the code may encode information associated with the transparent part, including at least one of a part number, part name, serial number, batch number, lot number, or patent number. In some embodiments, the code may be transparent, translucent, or opaque.

Figure 1:
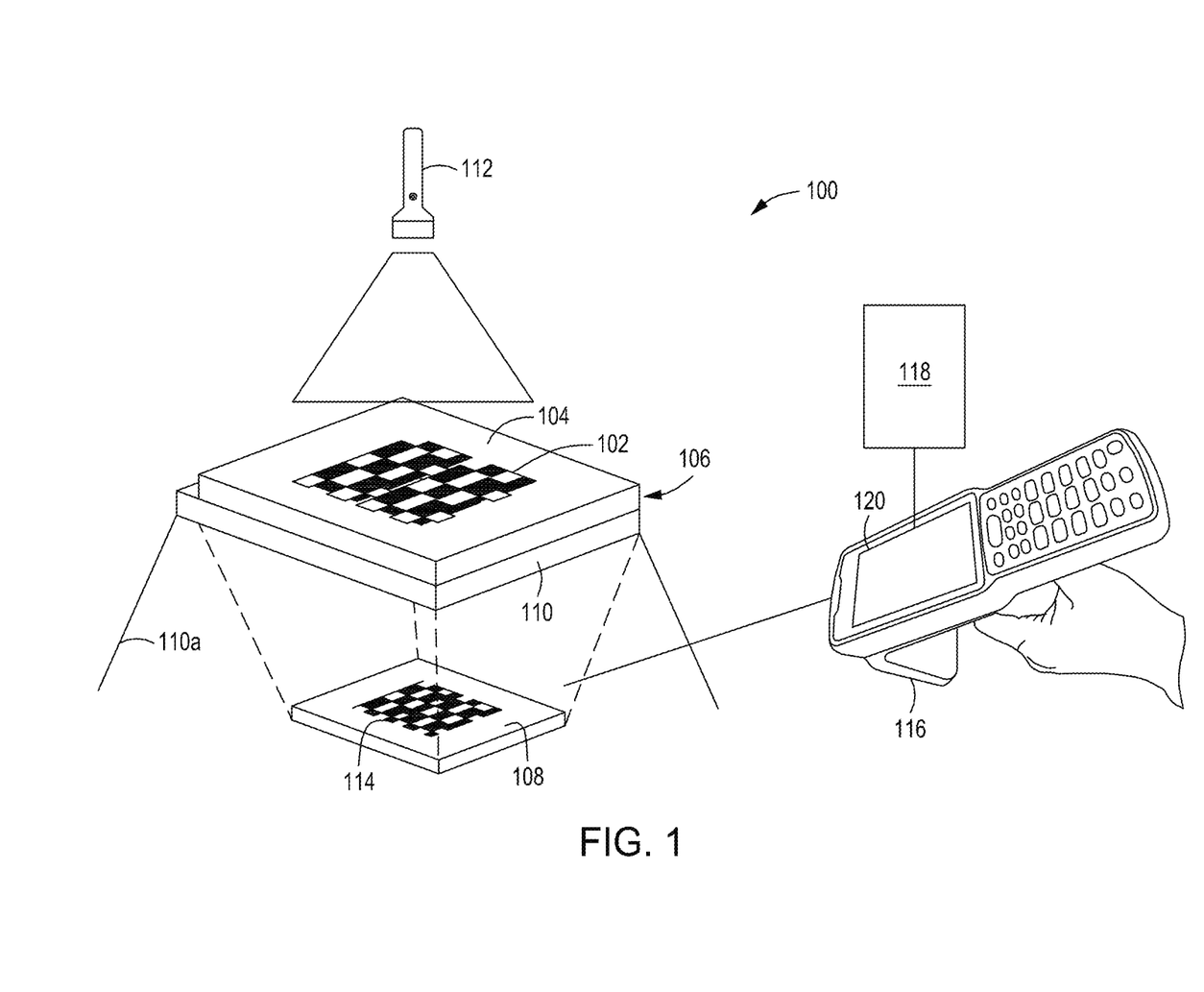
FIG. 1 shows a system for scanning a code in accordance with embodiments of the disclosure.

FIG. 1 shows a system 100 for scanning a code 102 on or in a transparent part 104 in accordance with embodiments of the present disclosure. In FIG. 1, the code 102 is shown as being two-dimensional. In some embodiments, and as shown in FIG. 1, the system 100 may include a support structure 106 configured to support the transparent part 104 spaced apart from a projection surface 108. In some embodiments, and as shown in FIG. 1, the support structure 106 may include a stage 110 to hold the transparent part 104 spaced from the projection surface. The stage 110 may be formed from a transparent material, such as glass or quartz. In some embodiments, the stage 110 may be formed of the same material as the transparent part 104.

In some embodiments, and as shown in FIG. 1, the system 100 may include a light source 112 configured to illuminate the code 102 to generate a projected image 114 of the code 102 on the projection surface 108. The light source 112 may include one or more light sources, such as LEDs or incandescent bulbs. The light source 112 may be a white light source. In some embodiments, the light source 112 may generate electromagnetic radiation having wavelengths longer or shorter than visible light, such as ultraviolet light and infra-red light.

In some embodiments, and as shown in FIG. 1, the system 100 may include a scanner 116 configured to machine scan the projected image 114 on the projection surface 108. The scanner 116 may be configured to scan various codes, such as a bar code and a QR code. In some embodiments, and as shown in FIG. 1, the scanner 116 may be communicatively coupled to a computer system 118 configured for decoding the code 102 based on the projected image 114. The computer system 118 may also be configured to send information (e.g., part name, part number, lot number, batch number, etc.) associated with the code 102 to the scanner 116 for output on the scanner 116. For example, the scanner 116 may have an electronic display 120 to display information associated with the code 102.

In some embodiments, and a shown in FIG. 1, the stage 110 may be supported by one or more legs 110a, which may be supported by the projection surface 108. In some embodiments, the stage 110 may be moveable or adjustable relative to the projection surface 108 and the light source 112 to adjust the position of the transparent part 104 and the code 102 relative to the light source 112 and the projection surface 108. The adjustment in position of the transparent part 104 and the code 102 relative to the light source 112 and the projection surface 108 may be useful to correct for distortion of the projected image 114, as discussed in greater detail below. In some embodiments, the stage 110 may be moveable to space the transparent part 104 at a certain distance (e.g., at least 5 cm) from the projection surface 108. Such spacing may facilitate focusing the projected image 114 with sufficient detail to be successfully scanned by the scanner 116.

Figures 2A, 2B:
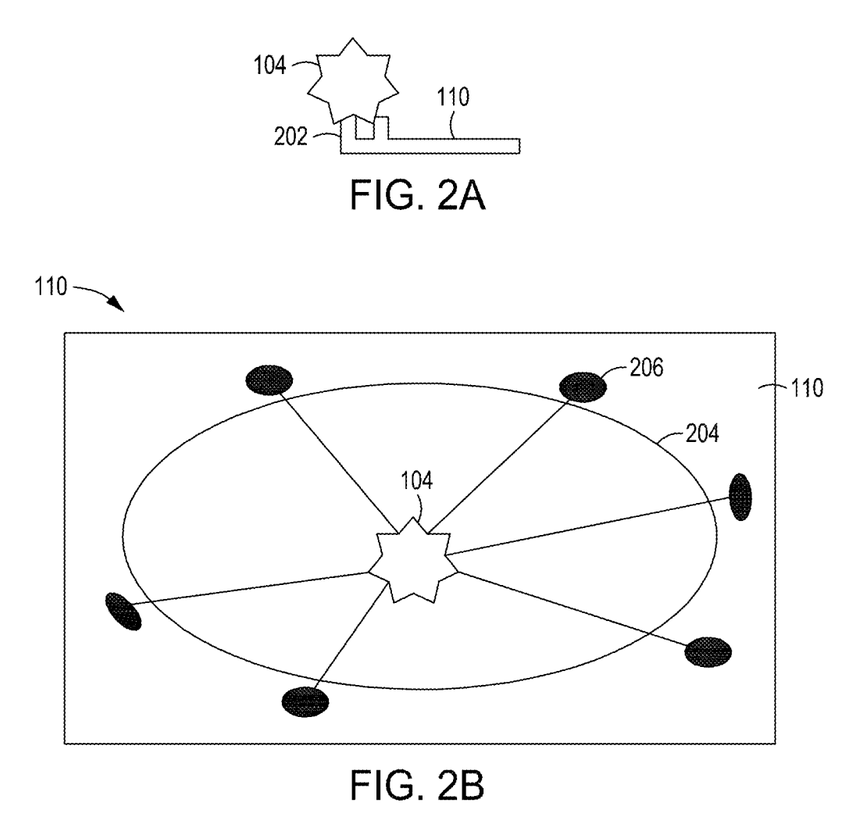
FIGS. 2A-2C show various part retention arrangements in accordance with embodiments of the disclosure.
Figure 2C:
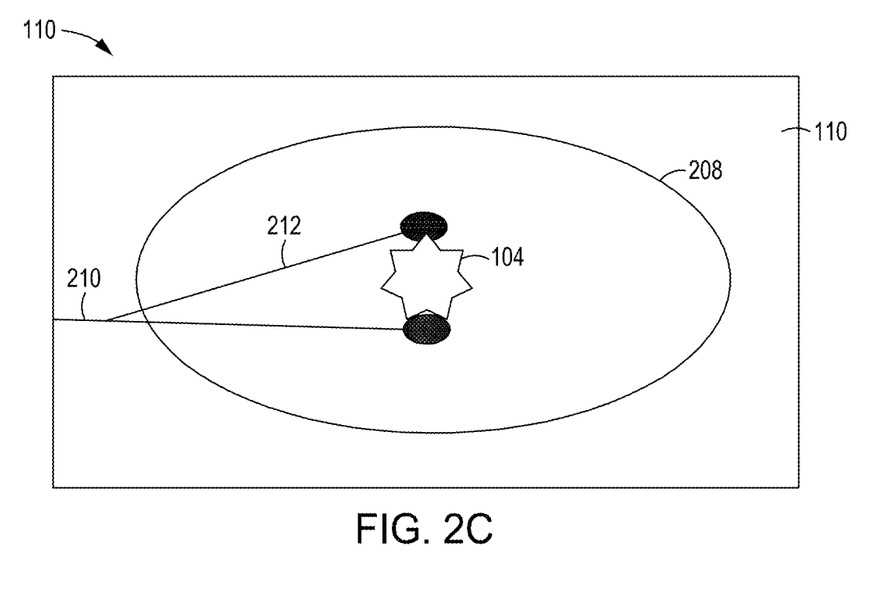

In some embodiments, and as shown in FIGS. 2A-2C, the stage 110 may include various retention arrangements to hold the transparent part 104 without obstructing light from passing through at least one of the transparent part 104 or the code 102. FIG. 2A shows a protrusion 202 extending upwards from the stage 110. The protrusion 202 may be configured to hold the transparent part 104 above an upper surface of the stage 110. The protrusion 202 may have a shape that conforms to a portion of the transparent part 104 to improve the fit between the transparent part 104 and the stage 110. In some embodiments, the retention arrangement may include a groove or recess (not shown) in the upper surface of the stage 110 that may receive at least a portion of the transparent part 104.

FIG. 2B shows an embodiment of the stage 110 that includes a ring 204 and a plurality of set screws 206 extending through the ring 204. One or more of the set screws 206 can be adjusted (e.g., threaded) radially inwardly or outwardly to clamp or otherwise secure the transparent part 104 to the stage 110.

FIG. 2C shows an embodiment of the stage 110 that includes a ring 208 and a clamp 210 connected to the ring 208. The clamp 210 may have jaws 212 that can be opened to receive or remove at least a portion of the transparent part 104. The jaws 212 can be closed to secure the transparent part 104 to the stage 110.

In some embodiments, the projection surface 108 may be a flat, smooth, non-transparent surface. The projection surface 108 may be colored or shaded to adjust the contrast level between the projection surface 108 and the projected image 114 to facilitate machine scanning the projected image 114 with the scanner 116. In some embodiments, the color of the projection surface 108 may be selected so that the contrast between the projected image 114 and the projection surface 108 is at least 50%.

Figure 3:
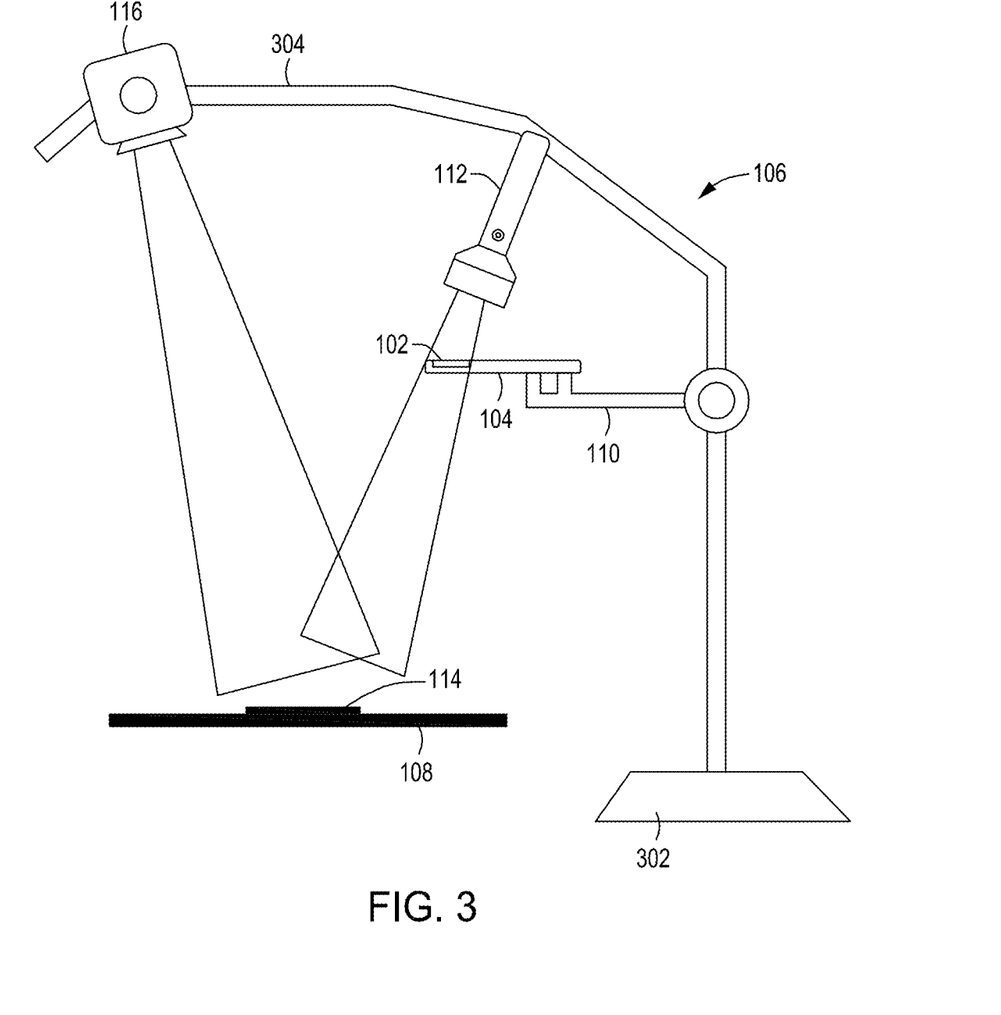
FIG. 3 shows a system for scanning a code in accordance with embodiments of the disclosure.

In some embodiments, and as shown in FIG. 3, the support structure 106 may include a base 302 and an arm 304 extending upwardly and outwardly from the base 302. In some embodiments, and as shown in FIG. 3, at least one of the light source 112, the scanner 116, or the stage 110 may be attached (e.g., movably) to the arm 304. In some embodiments, at least one of the light source 112, the scanner 116, or the stage 110 may be pivotally attached to the arm 304. In some embodiments, at least one of the light source 112, the scanner 116, or the stage 110 may be attached to the arm 304 to translate, such as up or down and/or side to side.

Figure 4:
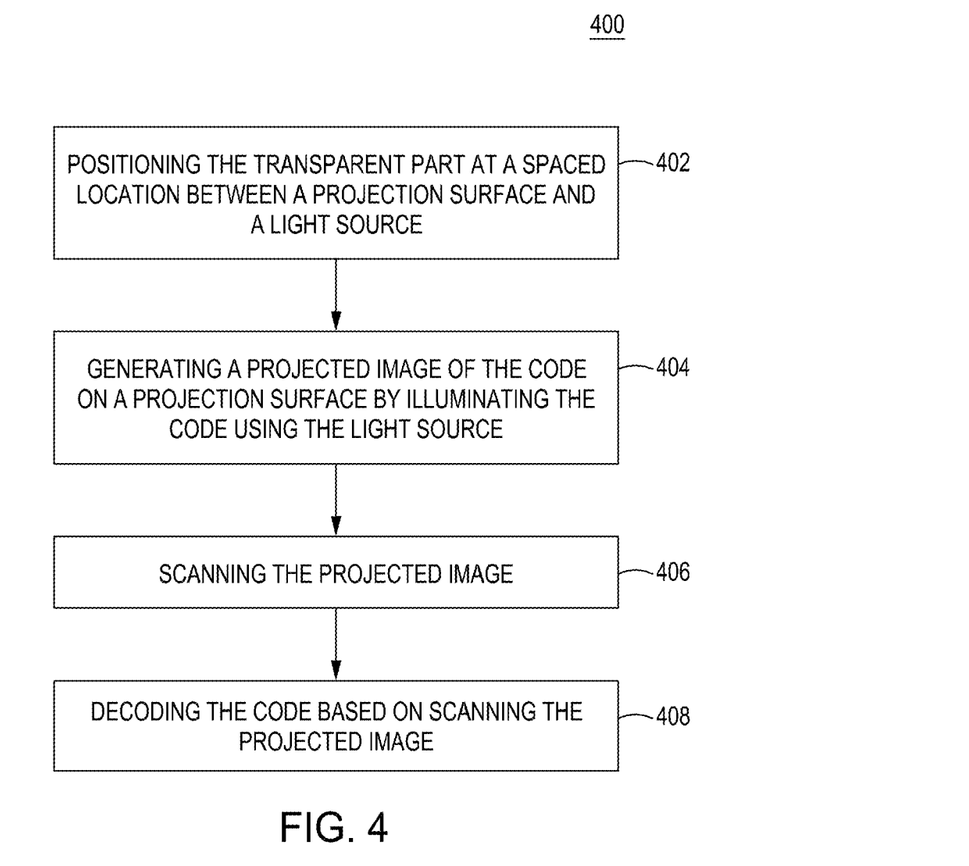
FIG. 4 shows a method for scanning a code in accordance with embodiments of the disclosure.

FIG. 4 shows a method 400 for scanning a code on or in a transparent part in accordance with embodiments of the present disclosure. At block 402, the transparent part is positioned at a spaced location between a projection surface and a light source. In some embodiments, the method may include disposing the transparent part at at least a certain distance (e.g., 5 cm) from the projection surface. At block 404, a projected image of the code is generated on a projection surface by illuminating the code using the light source. For example, with reference to the system 100 shown in FIG. 1, the light source 112 may illuminate the code 102 to generate the projected image 114 on the projection surface 108. At block 406, the projected image is scanned (e.g., machine scanned). For example, with reference to the system shown in FIG. 1, the scanner 116 may be used to scan the projected image 114 on the projection surface 108. At block 408, the code is decoded based on scanning the projected image. In some embodiments, at block 408, the method may include retrieving information about the transparent part based at least on the machine scanning of the projected image. For example, the scanner 116 may communicate with the computer system 118 to retrieve a part identification number of the transparent part 104.

Figure 5:
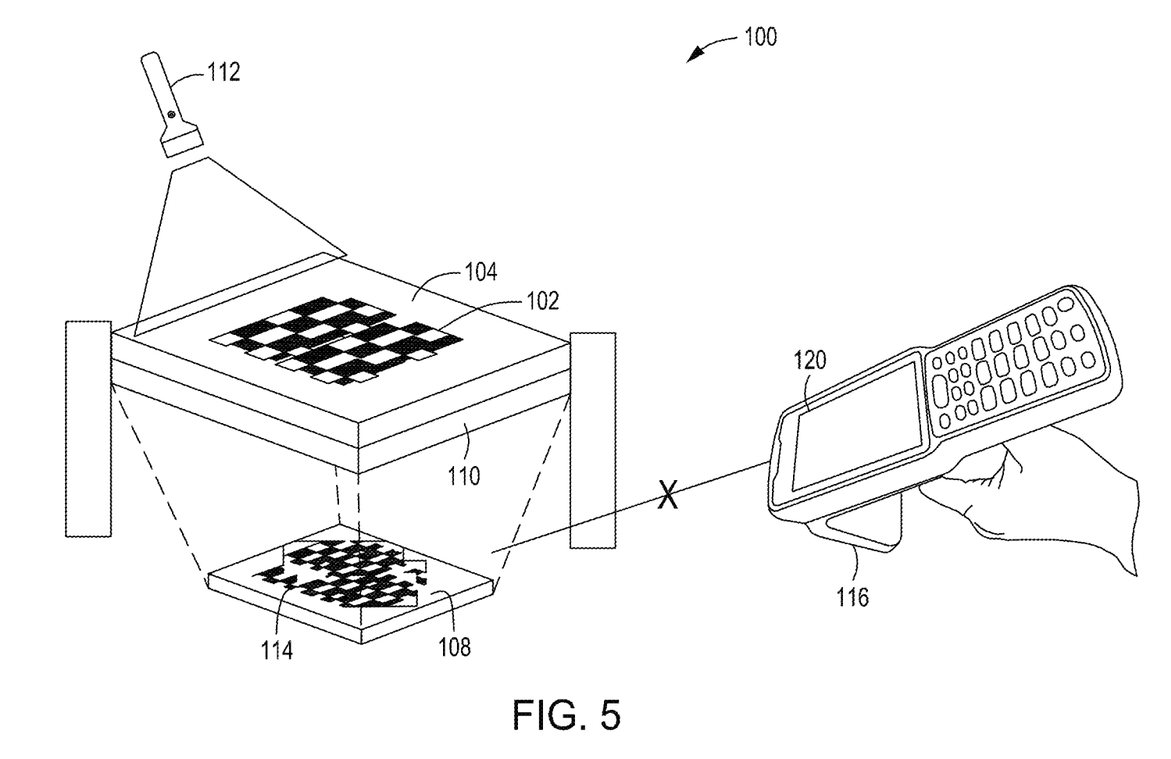
FIG. 5 shows a system for scanning a code in accordance with embodiments of the disclosure.

In some embodiments, the method 400 may include adjusting a relative position of the code 102 with respect to the projection surface 108. Adjusting the relative position of the code 102 with respect to the projection surface 108 may be useful to correct for image distortion of the projected image 114. For example, in the embodiment shown in FIG. 1, the light source 112 is shown generating parallel light generally perpendicular to a plane of the code 102. Also, in FIG. 1, the plane of the code 102 and the plane of the projection surface 108 are parallel to each other. As a result, the projected image 114 is projected onto the projection surface 108 in-focus and without image distortion so that the scanner 116 can successfully scan the projected image 114. In comparison to the arrangement shown in FIG. 1, in the embodiment shown in FIG. 5, the light source 112 may be arranged so that the light is not perpendicular to the plane of the code 102. As a result, and as shown in FIG. 5, the projected image 114 may be out of focus and/or distorted by image torsion so that the scanner 116 may not be able to successfully scan the projected image 114. To make the projected image 114 in FIG. 5 readable by the scanner, the relative position of the code 102 with respect to the projection surface 108 may be adjusted such as by moving or otherwise adjusting at least one of the stage 110 supporting the transparent part 104 or the projection surface 108.

Figure 6:
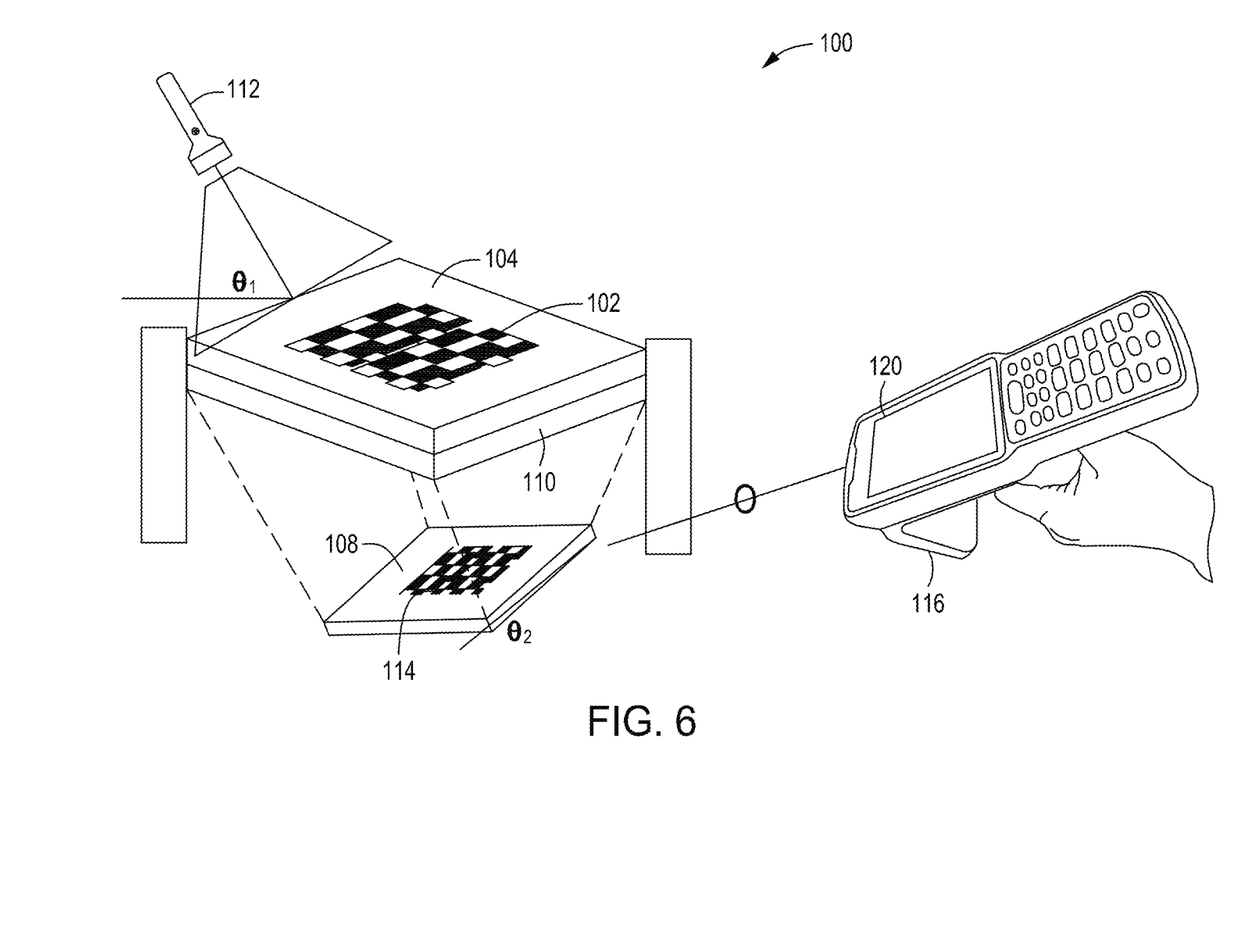
FIG. 6 shows a system for scanning a code in accordance with embodiments of the disclosure.

FIG. 6 shows the system 100 in FIG. 5 after the position of the projection surface 108 is adjusted relative to the stage 110 (as well as the transparent part 104 and the code 102) so that the image distortion is corrected to permit the projected image 114 to be successfully scanned by the scanner 116.

Figure 7:
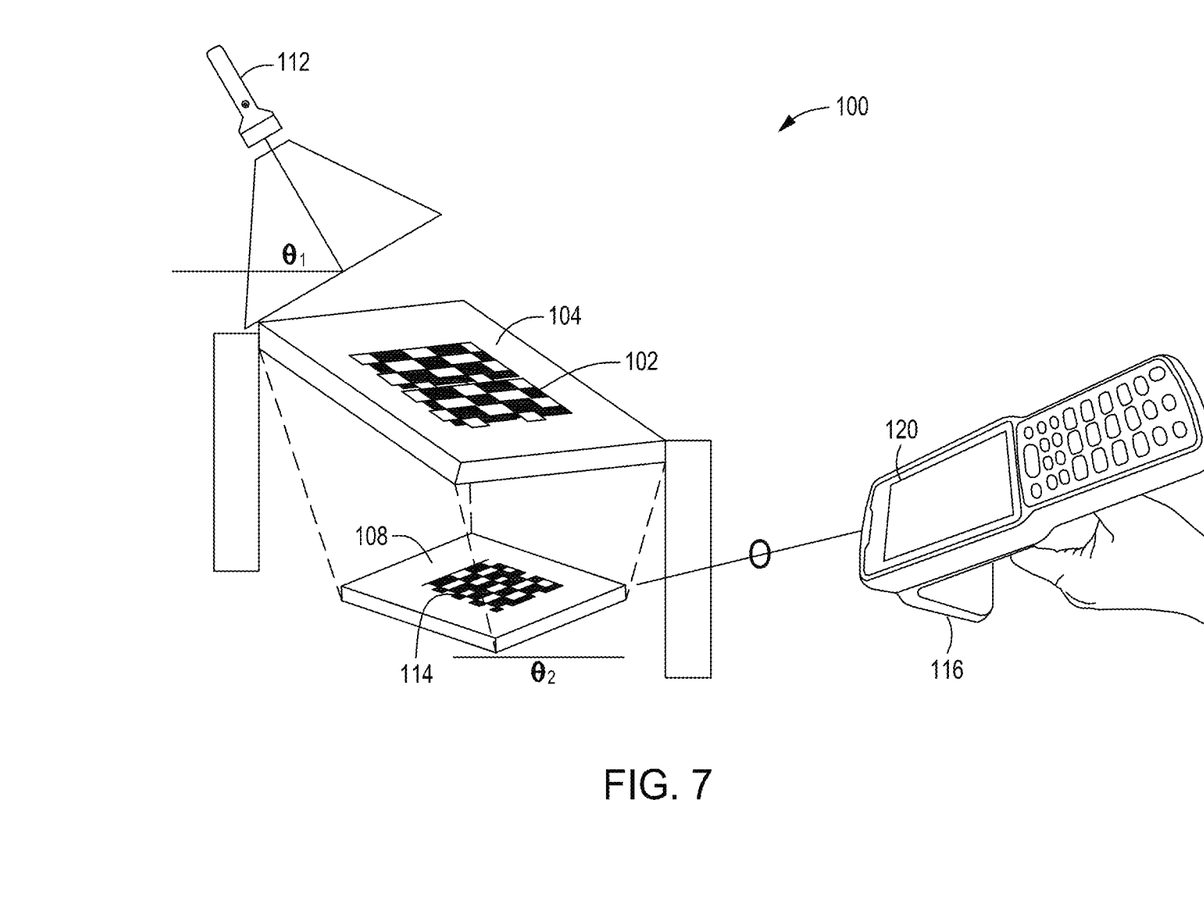
FIG. 7 shows a system for scanning a code in accordance with embodiments of the disclosure.

FIG. 7 shows the system 100 in FIG. 5 after the position of the stage 110 (along with the code 102 and the transparent part 104) is adjusted relative to the projection surface 108 so that the image distortion is corrected to permit the projected image to be successfully scanned by the scanner 116.

Figure 8:
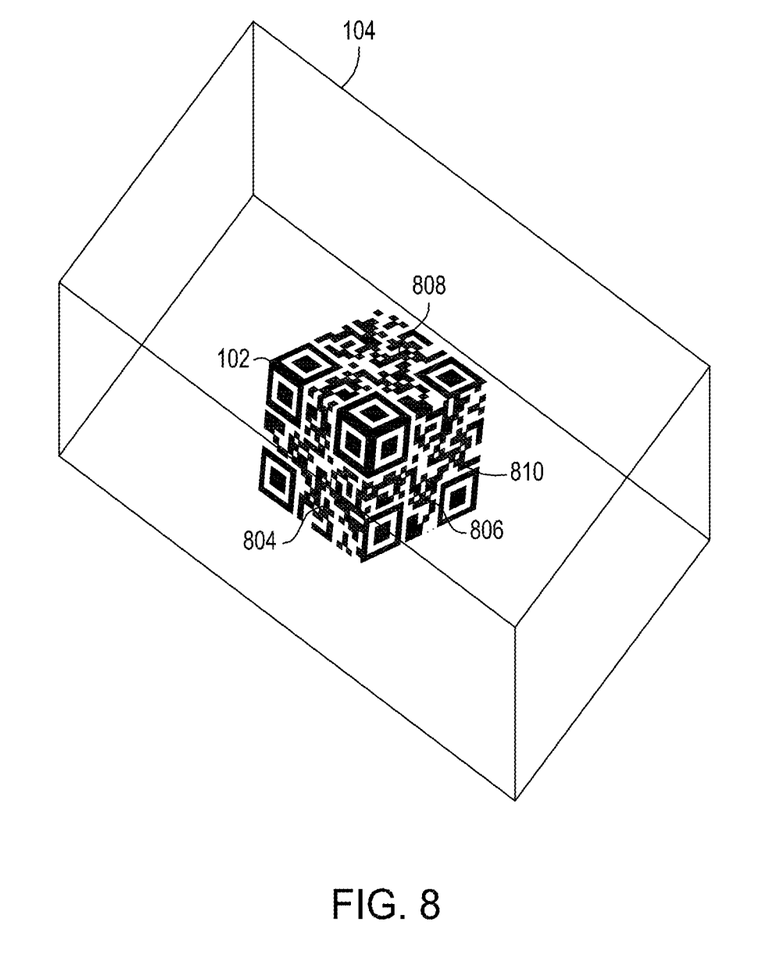
FIG. 8 shows a three-dimensional code in accordance with embodiments of the disclosure.

FIG. 8 shows an embodiment of the code 102 as a three-dimensional code in the transparent part 104. In some embodiments, and as shown in FIG. 8, the code 102 may have a cube shape and may have at least a first side 804, a second side 806, and a third side 808 encoded with information associated with a transparent part. In some embodiments, and as shown in FIG. 8, one or more sides (e.g., 804, 806, or 808) of the code 102 may include a two-dimensional code 810, which may be scanned using the systems and methods described herein.

In some embodiments, multiple projected images may be created and scanned in conjunction with rotating the transparent part 104 with respect to a light source. In some embodiments, the transparent part 104 may be at a first orientation and light may be directed to the code 102 to create a first projection that is scanned, the transparent part 104 may be rotated to a second orientation (e.g., different from the first orientation) so the light is directed to the transparent part 104 again to create a second projection that is scanned, and the transparent part 104 may be rotated again to a third orientation (e.g., different than the first and the second orientation) so that the light is directed to the transparent part 104 again to create a third projection that is scanned.

In some embodiments, a method for scanning the code 102 on or in the transparent part 104 may include illuminating the code 102 to generate a first projected image of the code on a projection surface spaced from the transparent part and machine scanning the first projected image. The method may include rotating the transparent part 104 from a first orientation to a second orientation, illuminating the code 102 to generate a second projected image of the code 102 on the projection surface, and machine scanning the second projected image. The method may also include rotating the transparent part 104 from the second orientation to a third orientation, illuminating the code 102 to generate a third projected image of the code 102 on the projection surface, and machine scanning the third projected image. The transparent part 104 may be rotated additional times to generate additional projected images that can be machine scanned.

In some embodiments, the code 102 may be illuminated to generate a first projected image of the first side 804 of the code 102 on a projection surface and the first projected image may be scanned. The transparent part 104 may be rotated so that the code 102 may be illuminated to generate a second projected image of the second side 806 of the code 102 on the projection surface and the second projected image may be scanned. The transparent part 104 may be rotated again so that the code 102 may be illuminated to generate a third projected image of the third side 808 of the code 102 on the projection surface and the third projected image may be scanned.

In some embodiments, different types of information associated with the transparent part 104 may be grouped on different sides (e.g., 804, 806, or 808) of the code 102. In some embodiments, the first side 804 may be encoded with static information about the transparent part 104, including part number, serial number, part name, lot number, batch number. Static information may refer to information about the transparent part 104 that does not change over the lifetime of the transparent part 104. In some embodiments, at least one of side of the code 102 may be encoded with information that may change over the lifetime of the transparent part 104. In some embodiments, at least one of the second side 806 or the third side 808 may be encoded with information that may change over the lifetime of the transparent part 104. For example, in some embodiments, the second side 806 may be encoded with information associated with recycling or cleaning history of the transparent part 104, including the number of times the transparent part 104 has been through a recycling or cleaning process. In some embodiments, the third side 808 may be encoded with information associated with repair history of the transparent part 104. In some embodiments, a three-dimensional code 102 may be marked on the transparent part 104 after at least one of the cleaning recycling or cleaning history or the repair history of the transparent part 104 changes. Thus, part tracking using a three-dimensional code may increase the amount of information carried with a part and provide detailed part history such as recycle history, cleaning history, and repair history over the lifetime of the part.

The methods and systems in accordance with the present disclosure facilitate scanning codes on or in transparent parts. The methods and system may be used to identify and track transparent parts moving throughout a production system, such as a semiconductor production system (e.g., a cluster tool).

While the foregoing is directed to embodiments of the present disclosure, other and further embodiments of the disclosure may be devised without departing from the basic scope thereof.

The invention claimed is:

1. A method for scanning a three-dimensional code on or in a transparent part, the method comprising:
    illuminating a first side of the three-dimensional code to generate a projected image of the three-dimensional code on a projection surface spaced from the transparent part;
    machine scanning the projected image;
    illuminating a second side of the three-dimensional code to generate a second projected image of the three-dimensional code on the projection surface; and
    machine scanning the second projected image,
    wherein the first side is encoded with static information that does not change over a lifetime of the transparent part, and the second side is encoded with information that changes over the lifetime of the transparent part.

2. The method of claim 1, wherein the three-dimensional code includes at least one of a QR code or a bar code that encodes information associated with the transparent part.

3. The method of claim 1, further comprising:
    illuminating a third side of the three-dimensional code to generate a third projected image of the three-dimensional code on the projection surface spaced from the transparent part; and
    machine scanning the third projected image.

4. The method of claim 1, further comprising disposing the transparent part at least 5 cm from the projection surface.

5. The method of claim 1, further comprising retrieving information about the transparent part based at least on the machine scanning of the projected image.

6. The method of claim 1, wherein illuminating includes positioning the transparent part between a light source and the projection surface and directing light generated by the light source toward the three-dimensional code.

7. The method of claim 1, further comprising adjusting a relative position of the three-dimensional code with respect to the projection surface.

8. The method of claim 1, wherein a contrast between the projected image and the projection surface is at least 50%.

9. The method of claim 1, wherein the three-dimensional code is associated with a part identification number of the transparent part.

10. A system for scanning a three-dimensional code on or in a transparent part, the system comprising:
- a support structure configured to support the transparent part spaced apart from a projection surface; and
- a light source configured to illuminate the three-dimensional code to generate a projected image of the three-dimensional code on the projection surface,
- wherein the three-dimensional code has a first side and a second side, wherein the first side is encoded with static information that does not change over a lifetime of the transparent part, and the second side is encoded with information that changes over the lifetime of the transparent part.

11. The system of claim 10, further comprising a scanner configured to machine scan the projected image.

12. The system of claim 10, wherein the support structure includes a stage configured to hold the transparent part, and wherein the stage is moveable relative to the projection surface and the light source.

13. The system of claim 12, wherein the stage is moveable to space the transparent part at least 5 cm from the projection surface.

14. The system of claim 12, wherein the light source is attached to the support structure.

15. The system of claim 10, wherein the light source includes a white light source.

16. The system of claim 10, wherein the support structure includes a base, an arm extending upward and outward from base, and a moveable stage coupled to at least one of the base or the arm, wherein the moveable stage is configured to dispose the transparent part at a spaced location between the light source and the projection surface.

17. The system of claim 16, further comprising a scanner configured to machine scan the projected image, wherein at least one of the light source or the scanner is movably coupled to the arm.

18. A method for scanning a three-dimensional code on or in a transparent part, the method comprising:
- positioning the transparent part at a spaced location between a projection surface and a light source;
- generating a first projected image of a first side of the three-dimensional code on a projection surface by illuminating the first side of the three-dimensional code using the light source;
- scanning the first projected image;
- generating a second projected image of a second side of the three-dimensional code on a projection surface by illuminating the second side of the three-dimensional code using the light source;
- scanning the second projected image,
- wherein the first side is encoded with static information that does not change over a lifetime of the transparent part, and the second side is encoded with information that changes over the lifetime of the transparent part; and
- decoding the information encoded on the first side and the second side of the three-dimensional code based on scanning the first projected image and the second projected image.

19. The method of claim 18, wherein the transparent part is fixed at a position spaced at least 5 cm from the projection surface.

20. The method of claim 18, further comprising adjusting a relative position of the three-dimensional code with respect to the projection surface.

* * * * *